United States Patent [19]

Ichikawa

[11] Patent Number: 4,742,570
[45] Date of Patent: May 3, 1988

[54] MULTIPATH NOISE DETECTING CIRCUIT
[75] Inventor: Nobuo Ichikawa, Iwaki, Japan
[73] Assignee: Alpine Electronics Inc., Japan
[21] Appl. No.: 899,813
[22] Filed: Aug. 25, 1986
[30] Foreign Application Priority Data Aug. 23, 1985 [JP] Japan .......................... 60-128593[U]

[51] Int. Cl.$^4$ ............................................. H04B 1/10
[52] U.S. Cl. .................................. 455/312; 455/307; 455/309; 381/94
[58] Field of Search ............... 455/218, 219, 210–213, 455/222, 223, 307, 309, 312; 381/13, 94

[56] References Cited

U.S. PATENT DOCUMENTS 4,301,541 11/1981 Tanaka et al. ...................... 455/312
4,397,040 8/1983 Jandel et al. ....................... 455/211
4,466,133 8/1984 Price .................................. 455/303
4,480,335 10/1984 Kishi .................................. 381/13
4,491,957 1/1985 Kamalski ........................... 381/13

Primary Examiner—Michael A. Masinick
Attorney, Agent, or Firm—Guy W. Shoup

[57] ABSTRACT

A multipath noise detecting circuit, which is not affected by ignition noise nor by the level of the antenna input voltage, includes a band pass filter having a mean frequency of 114 KH supplied with signals output from a FM demodulator, an AM detector for subjecting the signal input from said band pass filter to AM-detection, and a detector section for detecting as multipath noise the pulses included in the signal output from said AM-detector.

3 Claims, 1 Drawing Sheet

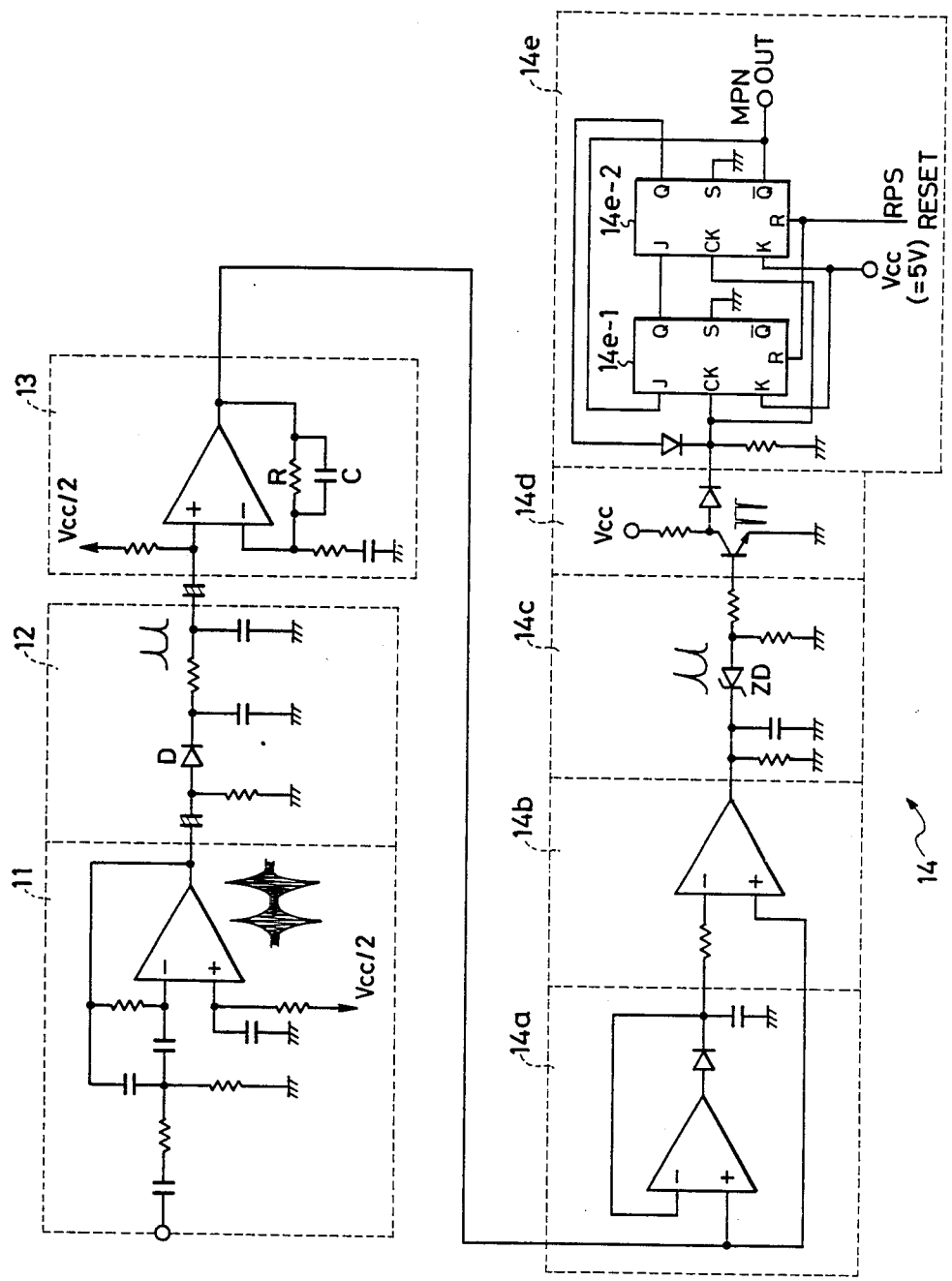

MULTIPATH NOISE DETECTING CIRCUIT

BACKGROUND OF THE INVENTION

1. Field of the Invention

This invention relates to a multipath noise detecting circuit and more particularly to such a circuit which is not affected by ignition noise nor by the level of the antenna input voltage.

2. Description of the Prior Art

There are known radio receivers additionally with a multipath noise detecting circuit for improvement in multipath noise and multipath distortion.

A conventional countermeasure for improviding multipath noise and multipath distortion is, for example, to extract a concerned signal from a section of a noise suppressor circuit (for instance, refer to IC circuit LA2110 produced by Tokyo Sanyo Electric Co., Ltd.) and cause the signal to interrupt the stereo noise control function (Referred to as SNC function) and the high cut control function (HCC function) of a multistereo demodulator (refer to IC circuit LA 3375 produced by the same Company) Practically the occurrence of multipath interference can be sensed by detecting a harmonic (noise of 100 KHz or higher) appearing due to it by the utilization of high pass amplifier, a noise detector, and a monostable multiple circuit dispersed in a noise suppressor circuit and on the basis of this, the SNC terminal and HCC terminal of the multistereo demodulator are brought to a lower level.

Another known countermeasure comprises subjecting the IF signal appearing when multipath interference occurs to level detection, and the AM-demodulation component of the detected signal is amplified and rectified in order to detect the multipath interference. Then the SNC terminal and HCC terminal of the multistereo demodulator are brought to a low level.

In the first technique is encountered a problem that because of the common use of the noise suppressor circuit, detection is made over too wide a band ranging from 90 to 300 KHz and thus no distinction is possible between ignition noise and multipath interference.

The second technique, though it improves the problem involved in the first technique, is disadvantageous in that antenna input voltages of high levels cause the limiter to operate resulting in a drop in the capability of detecting the AM-modulated component and in turn in unreliable operation.

SUMMARY OF THE INVENTION

It therefore is the principal object to provide a multipath noise detecting circuit which is not affected by ignition noise nor by antenna input voltage level.

BRIEF DESCRIPTION OF THE DRAWING

The accompanying drawing is a schematic diagram showing in detail such an multipath noise detecting circuit embodying the invention.

DESCRIPTION OF THE EMBODIMENT OF THE INVENTION

Reference numerals designate 11, a band pass filter having a mean frequency of 114 KHz; 12, an AM detector for AM-detecting the signal output from the band pass filter; 13, a low pass amplifier for amplifying the signal output from the AM detector; and 14, a detector section for detecting pulses included in the amplifier output signal as multipath noise, and which comprises a peak hold circuit 14a, a comparator 14b, a level shift circuit 14d and a binary counter 14e.

The peak hold circuit 14a and a comparator 14b constitute an automatic follow-up comparator.

Upon occurrence of multipath interference, the subcarrier of 38 KHz becomes distorted, involving the occurrence of the third harmonic component of 114 KHz. Accordingly, the multipath interference can be sensed by detecting the third harmonic component of 114 KHz and checking for the level of the 114 KHz AM-demodulated noise to be over a definite level.

In this way, the multipath noise detecting circuit according to the invention is composed essentially of a band pass filter having a means frequency of about 114 KHz supplied with a signal from a FM demodulator, an AM detector for AM-detecting the signal input from the band pass filter, and a detector section for detecting as multipath noise the pulses included in the signal output from the AM detector.

Referring to the drawing, the band pass filter 11 having a mean frequency of 114 KHz receives the output of a FM demodulator. Further the means frequency, 114 KHz, corresponds to the frequency of the third harmonic of the subcarrier (38 KHz). In the AM detector 12, provided with a diode D, the signal output from the band pass filter is subjected to AM detection. The amplifier 13 operates as a low pass 20 dB amplifier with a capacitor inserted in parallel to the resistance R determinative of the amplification degree, to amplify the signal output from the AM detector.

The detector section for detecting pulses included in the amplifier output signal as multipath noise, comprises a peak hold circuit 14a, a comparator 14b, a level shift circuit 14c, an interface circuit 14d, and a binary counter 14e. The peak hold circuit 14a and the comparator 14b constitute an automatically-following comparator. The peak hold circuit 14a holds the $\Delta t$-earlier input voltage value, $V_{i-1}$, and the comparator 14b makes comparison between $V_{i-1}$ and the input voltage at the present time, $V_i$, and output signals when $V_i > V_{i-1}$.

The level shift circuit 14c which comprises, for example, a zener diode ZD, performs distinction between noise and signals when multipath interference occurs. The interface circuit 14d converts the input signal level to not higher than 5 V, followed by shaping before outputting the pulses and then to the succeedingly-connected binary counter 14e which is caused to operate at 5 V.

The binary counter 14e is of two stage type composed of two J-K flip-flops as of MC14027B $14e-1$, $14e-2$ and which is so constructed that, when two pulse signals are detected a low level "multipath interference-detected" signal is output from the $\overline{Q}$ terminal of the second-step J-K flip-flop.

Such a design ensures that when at least two pulses are input by the use of a binary counter, a multipath interference signal is output, thus preventing the erroneous operation due to noise other than multipath interference. The binary counter is not always required and instead an ordinary latch circuit may be used.

The operation of the pulse noise detecting circuit according to the invention will be described below with reference to the accompanying drawing:

To check whether multipath interference occurs or not, firstly a reset pulse signal (RPS), for previously bringing the flip flops 14e—1 and 14e—2 of the binary counter 14e into the reset state is generated.

In this state, upon occurrence of multipath interference, the subcarrier of 38 KHz becomes distorted, which in turn produces the third harmonic component. When multipass interference occurs, the bandpath filter 11 having a mean frequency of 114 KHz outputs the third harmonic component.

The AM detector 12 subjects the output signal of the bandpass filter to diode-detection, and outputs the detected signal through the lowpass amplifier 13 to the peak hold circuit 14a and the comparator 14b. These circuits, which constitutes an automatically-following comparator, detect pulse signals included in the output of the lowpass amplifier 13 and the detected pulses are output from the comparator 14b and input to the binary counter 14e through the level shift circuit 14c and the interface circuit 14d.

The first pulse causes the contents of the binary counter to change from "00" into "10" and the second pulse changes the count to "11", and thereafter regardless of whether a pulse is input or not, low level "multipath noise (MPN)-detected" signals are output from the $\overline{Q}$ terminal of the second-stage flip-flop 14e—2.

When a further check of new multipath interference is desired, the binary counter 14e is cleared by the reset signal.

As described above, a feature of the invention provides a multipath noise detecting circuit having a bandpass filter having a mean frequency of 114 KHz supplied with the signal output from a FM-demodulator, an AM-detector for subjecting the signal input from the band-pass filter to AM-detection, and a detector section for detecting a multipath noise the pulses included in the signal input from the AM detector. The circuit has the advantage that the band of noise detection is permitted to be limited to a narrowed range including 114 KHz, and is thus not affected by ignition noise. Another feature of the invention that the third harmonic of the subcarrier in the output of the FM demodulator is detected, produces the advantage that the operation is accomplishable independently of the level of the antenna input voltage and therefore has a high reliability.

What is claimed is:

1. A multipath noise detecting circuit for detecting multipath noise pulses directly from a signal output of a FM signal demodulator, comprising:

a band pass filter receiving the signal output of the FM signal demodulator having a mean frequency of three times a subcarrier frequency of the FM signal for outputting a third harmonic component signal of said FM signal;

an AM detector receiving the third harmonic component output of said band pass filter for detecting and outputting an amplitude detection signal; and a detector section receiving the amplitude detection signal from said AM detector for detecting multipath noise pulses included therein and outputting a multipath noise detection signal therefrom.

2. A multipath noise detecting circuit according to claim 1, wherein said detector section includes a peak hold circuit and a comparator, forming an automatically-following comparator circuit, for receiving the amplitude detection signal from said AM detector and outputting a pulse detection signal representing a detected mulipath noise pulse.

3. A multipath noise detecting circuit according to claim 2, wherein said detector section includes a counter circuit for counting pulse detection signals output from said automatically-following comparator circuit and for outputting the multipath noise detection signal when a predetermined number of pulse detection signals have been counted.

* * * * *